(12) United States Patent
Dilleen (10) Patent No.: US 9,553,330 B2
(45) Date of Patent: Jan. 24, 2017

(54) SEPARATORLESS STORAGE BATTERY

(71) Applicant: ENERGY DIAGNOSTICS LIMITED, Alloa (GB)

(72) Inventor: John Dilleen, Alloa (GB)

(73) Assignee: Energy Diagnostics Limited, Alloa (GB)

( * ) Notice: Subject to any disclaimer, the term of this patent is extended or adjusted under 35 U.S.C. 154(b) by 120 days.

(21) Appl. No.: 14/377,807

(22) PCT Filed: Mar. 1, 2013

(86) PCT No.: PCT/GB2013/050519
§ 371 (c)(1),
(2) Date: Aug. 8, 2014

(87) PCT Pub. No.: WO2013/128206
PCT Pub. Date: Sep. 6, 2013

(65) Prior Publication Data
US 2015/0004452 A1    Jan. 1, 2015

(30) Foreign Application Priority Data
Mar. 2, 2012  (GB) .................................. 1203713.1

(51) Int. Cl.
*H01M 10/04* (2006.01)
*H01M 8/20* (2006.01)
*H01M 10/02* (2006.01)

(52) U.S. Cl.
CPC ........... *H01M 10/0463* (2013.01); *H01M 8/20* (2013.01); *H01M 10/02* (2013.01); *H01M 10/0431* (2013.01); *Y02E 60/124* (2013.01); *Y02E 60/528* (2013.01); *Y02P 70/54* (2015.11); *Y10T 29/49115* (2015.01)

(58) Field of Classification Search
None
See application file for complete search history.

(56) References Cited

U.S. PATENT DOCUMENTS

| 3,900,341 | A | * | 8/1975 | Shoichiro | ............. | B32B 37/142 |
|  |  |  |  |  |  | 156/227 |
| 4,307,161 | A | * | 12/1981 | Brown | .................... | H01M 2/30 |
|  |  |  |  |  |  | 429/120 |
| 4,889,777 | A |  | 12/1989 | Akuto |  |  |

(Continued)

FOREIGN PATENT DOCUMENTS

| JP | 01093067 A | 1/1990 |
| JP | 02236965 A | 8/1991 |
| JP | 05129035 A | 2/1995 |

OTHER PUBLICATIONS

International Search Report dated Jun. 5, 2013 from PCT International Application No. PCT/GB2013/050519.

*Primary Examiner* — Carlos Barcena
*Assistant Examiner* — Wojciech Haske
(74) *Attorney, Agent, or Firm* — Nexsen Pruet, PLLC; E. Eric Mills (57) ABSTRACT

There is herein described energy storage batteries and methods of manufacturing said energy storage batteries. More particularly, there is described energy storage batteries comprising a laminar configuration and co-planar and co-parallel anodes and cathodes and methods of manufacturing said energy storage batteries.

17 Claims, 5 Drawing Sheets

(56) References Cited

U.S. PATENT DOCUMENTS

| | | | | |
|---|---|---|---|---|
| 5,106,708 A | * | 4/1992 | Bish | H01M 2/24 29/623.2 |
| 5,429,643 A | * | 7/1995 | Lund | H01M 2/12 29/623.3 |
| 2009/0092882 A1 | | 4/2009 | Kjeang et al. | |
| 2010/0081049 A1 | | 4/2010 | Holl et al. | |

* cited by examiner

SEPARATORLESS STORAGE BATTERY

FIELD OF THE INVENTION

The present invention relates to energy storage batteries and methods of manufacturing said energy storage batteries. More particularly, the present invention relates to energy storage batteries comprising a laminar configuration and co-planar co-parallel anodes and cathodes and methods of manufacturing said energy storage batteries.

BACKGROUND OF THE INVENTION

There are many types of energy storage systems and batteries. However, these previous types of systems are known to have a number of inadequacies and inefficiencies, such as in charge and discharge rates, electrical resistance, thermal management and response times.

The present invention is based on energy storage batteries comprising a laminar configuration and co-planar co-parallel anodes and cathodes whereas other laminar battery constructs use co-facial closely separated electrodes with separators between. For example, laminar battery constructs in coil form have been patented, e.g. U.S. Pat. Nos. 7,311,996, 6,146,785 and 5,354,629, which are incorporated herein by reference. However, these systems consist of co-facial electrodes with respective electrolyte and are separated with a separator membrane to keep the chemistries apart.

It is an object of at least one aspect of the present invention to obviate or mitigate the need for at least one or more of the aforementioned design features.

It is a further object of at least one aspect of the present invention to provide an improved energy storage battery system.

SUMMARY OF THE INVENTION

According to a first aspect of the present invention there is provided an energy storage battery comprising:

an electrochemically inert and electrically insulating substrate;

an anode located on one side of said substrate and a cathode located on the other side of said substrate, wherein the anode and cathode form electrodes which are located substantially co-planar and substantially co-parallel to one another;

a gap located between the anode and cathode which is capable of electrically insulating the anode and cathode electrodes;

a spacer defining a channel along the anode and cathode electrodes parallel to the gap between the electrodes; and an electrolyte deposited in the channel.

The present invention therefore resides in the provision of energy storage batteries comprising a laminar configuration and substantially co-planar co-parallel anodes and cathodes. The anode and cathode may therefore be of a flat planar structure i.e. film or plate-like.

Typically, there may be anode and cathode chemically active materials contained within the electrolyte.

The anode and cathode electrodes could be the same electrically conductive material in one example of a cell design or could be of dissimilar material e.g. zinc metal anode (negative electrode) and carbon composite cathode (positive electrode).

The cell could incorporate anode and cathode material and electrolyte chemistry which permits swapping the anode and cathode for reversed operation by changing the input polarity.

A further advantage of the battery design of the present invention is that some desirable battery chemistries that employ zinc chemistry, for example, at the negative electrode (e.g. nickel-zinc batteries) suffer disadvantages in conventional battery designs. There is a tendency for metal (zinc) dendrites to form and grow out from the negative electrode on recharging, and these dendrites can penetrate the separator in co-facial battery designs leading to short circuits and battery failure and safety risks. This failure mode is mitigated in a co-planar battery design since if dendrites form they would be restricted by the insulating substrate above, and the battery is designed to have sufficient gap between the negative and positive electrodes to prevent any lateral dendrite growth reaching the opposite electrode. This coupled with the potential for the battery design of the present invention to be operated with reversible negative and positive electrodes for certain chemistries opens up a range of desirable chemistries which otherwise cannot be employed in applications requiring long cycle lifetime.

There may also be a top layer positioned along the channel and resting on the spacer.

The parts forming the energy storage battery may be in the form of a spiral allowing the energy storage battery to be spiral shaped.

The energy storage battery may also comprise a continuous length of the relevant parts where the length is sectioned and sections stacked upon one another.

The energy storage battery may also comprise a continuous length of the relevant parts except the top layer where the length is spiralled or stacked such that the base of the substrate becomes the top layer of the channel.

The electrochemically inert and electrically insulating substrate may be a substantially flat planar structure and may be made from a polymer film e.g. PET, PP, PC, acrylic, teflon. The substrate may have a thickness of about 0.1 mm.

The anode and cathode located on either side of the electrochemically inert and electrically insulating substrate may be of a flat planar structure and may extend along the length of the substrate. The anode and cathode may be plate-like and have a length of about 500 meters for a spiral and about 50 cm for stacks, a width of about 15 mm and a thickness of about 10 microns and are made from electrically conductive material e.g. carbon, carbon as graphite or graphene, carbon polymer composite, carbon metal composite, gold, platinum, silver, palladium copper, molybdenum, nickel, zinc, aluminium, iron, metal alloys e.g. zinc nickel, nickel iron, metal oxides e.g. indium tin oxide, ruthenium oxide, lithium cobalt oxide, 'conducting polymer films e.g. polyaniline, polythiophene, poly(3,4-ethylenedioxythiophene) poly(styrenesulfonate), or combinations of layers, e.g. carbon coated on copper or aluminium film.

The anode and cathode could comprise a porous conductive carbon layer, for example carbon fiber felt, aerogel carbon, activated carbon, which serves to provide increased electrode surface area for the anode and cathode chemical reactions.

The substrate and the anode and cathode electrodes may have a spacer layer of about 0.2 mm thickness located on their outer sides.

The energy storage battery may have conductive connector ends which may be covered with further conductive layers, for example aluminium foil, on the outer surface of the single cell energy storage battery or outer surface of multiple cells in series. The conductive layers may form common connection points for battery terminals.

The channel may be filled and deposited with the required amount of electrolyte i.e. chemical material. The electrolyte may be deposited onto the substrate and electrodes and confined within the channel. The chemicals may be in liquid or paste forms. The chemicals may be a liquid or paste mixture of chemicals deposited evenly across the channel, e.g. zinc salt with a manganese or a nickel salt (e.g. zinc acetate or zinc chloride with nickel chloride or manganese chloride), or a lithium salt in an organic electrolyte e.g. ethylene carbonate, or deposited separately over the anode and the cathode.

The channel may be filled after assembly via fluidic entry ports through which the electrolyte is pumped through the channel to the point of exit ports, both type of ports are sealed after filling is complete. The electrolyte can be pumped into the channels of each cell separately as single or series arrangements. The electrolyte can be pumped into the channel in a battery comprising a stack of multiple cells with each cell having an entry hole alternating through the layers so as to fill the battery with minimal air entrapment.

At least two or more or a plurality of multiple single cell energy storage batteries may be laminated together.

According to a second aspect of the present invention there is provided a method of manufacturing an energy storage battery comprising:

providing an electrochemically inert and electrically insulating substrate;

providing an anode located on one side of said substrate and a cathode located on the other side of said substrate, wherein the anode and cathode form electrodes which are located substantially co-planar and co-parallel to one another;

providing a gap located between the anode and cathode which is capable of electrically insulating the anode and cathode;

providing a spacer defining a channel along the anode and cathode electrodes parallel to the gap between the electrodes; and providing an electrolyte deposited in the channel.

The energy storage battery may be as defined in the first aspect.

To manufacture the single cell energy storage battery system a substrate may first of all be selected and then conductive layers may be deposited. For example, a similar anode and cathode may be carbon-carbon, gold-gold or dissimilar within a particular design such as carbon-gold, carbon-carbon/zinc composite.

The substrate may be a series of cards or a continuous web of material in a reel to reel process.

The conductive layers may be patterned to define the conductive geometries making the electrodes and the conductive connector ends.

The spacer layers may be bonded together to form the channel. The spacer may be 'off the shelf', pre-assembled and converted to a pattern, double sided adhesive tape of defined thickness, or assembled layers of glue-polymer film-glue deposited by a printing process.

In embodiments where the substrate is a series of cards, the process may involve laminating over the next substrate layer over the channel thereby confining any chemicals in the channel. The layering may then be repeated until sufficient power specification is met. The top of the channel may be blanked off using an insulating substrate.

In embodiments where the substrate is in the form of a reel, the channel may be covered by rolling a sub-assembled web onto itself thereby confining the chemicals with the underside of the substrate. Winding may be continued until the end of the web. The conductive connector ends may then be coated with a conductive material such as copper or silver polymer paste which is then cured to form a common connection point for the battery terminals.

The above process can be performed using conductive geometries formatted for single or multiple cells in series and for spiral and stacked cards of both configurations.

Cells arranged in series can be designed to so that one side of the anode or cathode electrode can form the cathode or anode of the adjacent cell as long as the two sides have a spacer layer along the middle of its length thereby isolating the adjacent cells electrolytes while maintaining electrical connection between the cells in series. This arrangement can be termed a bipolar series cell arrangement and this is known to have advantages in lowering overall battery internal resistances.

BRIEF DESCRIPTION OF THE DRAWINGS

Embodiments of the present invention will now be described, by way of example only, with reference to the accompanying drawings in which.

BRIEF DESCRIPTION

Generally speaking, the present invention resides in the provision of energy storage batteries comprising a laminar configuration and co-planar co-parallel anodes and cathodes and methods of manufacturing said energy storage batteries.

Figure 1:
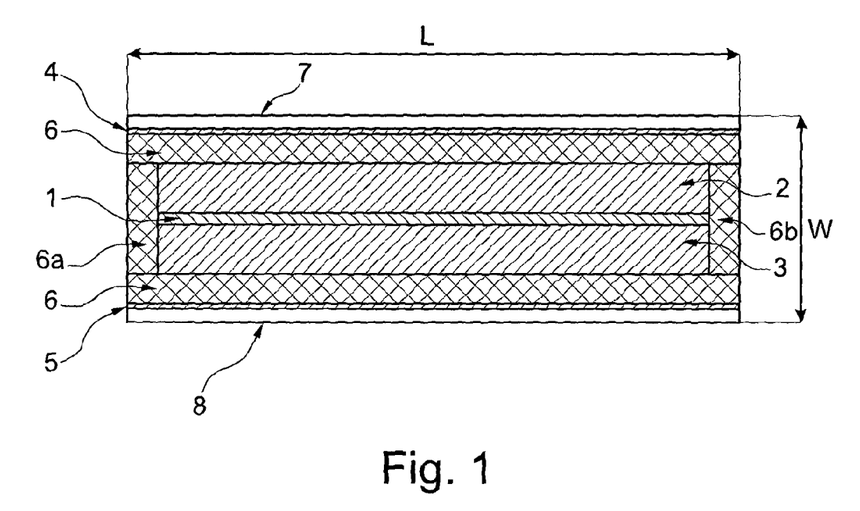
FIG. 1 is a top sectional view of a single cell energy storage battery according to an embodiment of the present invention.
Figure 2:
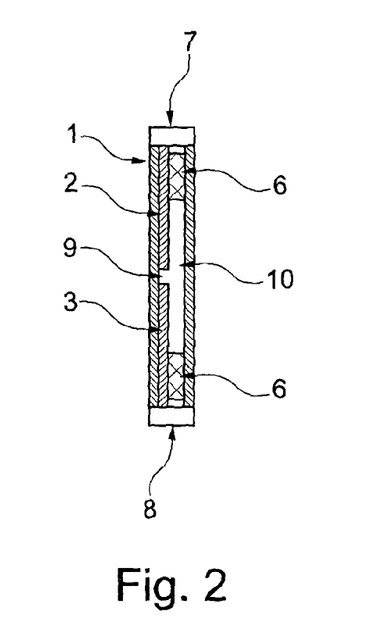
FIG. 2 is an end sectional view of the single cell energy storage battery shown in FIG. 1.

FIGS. 1 and 2 are representations of a single cell energy storage battery system according to the present invention. As shown in FIG. 1 the energy storage battery system has a width 'W' and length 'L' with a number of layers located there between. Centrally located there is a substrate 1 which is of a substantially flat planar structure and is made from a polymer film e.g. PET, PP, PC, acrylic, teflon. The substrate 1 has a thickness of about 0.1 mm.

Located on both sides of the substrate 1 there are electrodes 2, 3 which are of a flat planar structure and extend along the length of the substrate 1. The electrodes 2, 3 have a thickness of about 10 microns and are made from electrically conductive material e.g. carbon, carbon as graphite or graphene, carbon, carbon-polymer composite, carbon-metal composite, gold, platinum, silver, palladium copper, molybdenum, nickel, zinc, aluminium, iron, metal alloys e.g. zinc nickel, nickel iron, metal oxides e.g. Indium tin oxide, ruthenium oxide, lithium cobalt oxide, 'conducting polymer films e.g. polyaniline, polythiophene, poly(3,4-ethylenedioxythiophene) poly(styrenesulfonate), or combinations of layers, e.g. carbon coated on copper or aluminium film.

The substrate 1 and the electrodes 2, 3 then have a spacer layer 6 located on their outer sides. FIGS. 1 and 2 also show that at the ends 6a, 6b of the spacer layers 6, the spacer layers 6 are bonded to prevent any form of leakage occurring. The spacer layers 6, 6a and 6b may be a continuous piece of adhesive film which is for example preformed or printed to a thickness of about 0.2 mm.

FIGS. 1-4 also show that the conductive connector ends 4, 5 can be covered with conductive layers 7, 8 on the outer surface of the single cell energy storage battery system. The conductive layers 7, 8 can form common connection points for battery terminals. This conductive layer could also be a conductive metal foil, e.g. aluminium, which is held in place, e.g. by clamping or by conductive adhesive, between the outer of electrodes 2, 3 and the spacer 6, or could be held by extending spacer 6 over conductive layers 7, 8.

To manufacture the single cell energy storage battery system a substrate 1 is first of all selected and then conductive layers 2, 3 are deposited using coating techniques e.g. vapour deposition, printing, foil lamination, electrolysis. The substrate 1 may be a series of cards or a continuous web of material in a reel to reel process. The conductive layers 2, 3 may be patterned using stencil imaging e.g. screen printing, or by laser ablation, chemical etching, machining (milling, cutting), to define the conductive geometries making the electrodes 2, 3 and the conductive connector ends 4, 5. Electrodes 2 and 3 may function as either an anode or cathode, depending on the charge polarity, or on the chemistry deposited over each electrode, or on the electrode materials.

The spacer layers 6 are preassembled spacer of defined thickness or bonded together using pressure sensitive adhesive or other adhesive e.g. heat sensitive, by itself or either side of a polymer film of required thickness to form a channel 10 as shown in FIG. 2. The channel 10 creates an area where chemical reactions many be conducted between the electrodes 2, 3. The start and finish ends of the channel 10 have a spacer layer 6a and 6b to prevent any chemicals leaking from either end. The adhesive layers 6, 6a and 6b can be shaped as one piece preassembled, or printed as one for a continuous seal.

In use, the channel 10 will be filled and deposited with the required chemical material. The chemicals can be deposited onto the substrate 1 and electrodes 2, 3 and confined within the channel 10. The chemistries could be deposited onto the electrodes in the channel by pumping or extruding liquid or paste through a nozzle (as substrate winds reel to reel past nozzle) or on stationary cards moving the nozzle along (or by stencil printing of pastes). The chemicals could be in liquid or paste forms. The chemicals could be the same across the channel 10 over substrate 1 (at 9), 2, 3, e.g. a redox recycling chemical, such as potassium ferricyanide (FIG. 7) or zinc bromide (FIG. 8), in liquid solution; or the chemicals could be the same but in paste form.

The chemicals could be a liquid or paste mixture of chemistries deposited evenly across the channel, e.g. zinc salt with a manganese or a nickel salt (e.g. zinc acetate or zinc chloride with nickel chloride or manganese chloride), and could be buffered to a preferred pH.

The chemicals could be a mixture of chemistries deposited separately across the channel, e.g. chemistry 'x' over electrode 2 completely or partially, chemistry 'y' over electrode 3 completely or partially, along length L. These chemistries could meet at the middle of the channel 10, gap 9, or a third chemistry could be deposited between them, e.g. an electrolyte solution or paste.

The chemistry and electrolyte can be a fluid which is pumped into the preassembled cell through filling ports which are positioned below a channel at the end of the underside of a cell so fluid flows along the length of a channel and out of an exit port on the opposite end, FIG. 4a, ports 9, and both ports are sealed after filling. The channels of layered cells can be connected by alternate holes at the end of each channel so the fluid can be pumped back and forth along and up each cell until the cells are filled and sealed. The battery electrolyte can be replenished via the ports and also increased in amounts of chemicals by electrical charge and fluid replenishing cycles.

The chemicals define the cell as a primary or secondary (rechargeable) cell, and the device can be designed for either.

The cell may be designed as a secondary rechargeable system capable of repeated charge and discharge cycles thus suitable for energy storage and transfer applications.

Examples of battery chemistries are given in the table below and any of these could be incorporated into this design.

| Battery System | Negative Electrode | Positive Electrode | Electrolyte | Nominal Voltage (V) |
|---|---|---|---|---|
| Lead-Acid | Pb | $PbO_2$ | $H_2SO_4$ | 2.0 |
| Nickel Iron | Fe | NiOOH | KOH | 1.2 |
| Nickel Cadmium | Cd | NiOOH | KOH | 1.2 |
| Nickel Metal Hydride | H (as MH) | NiOOH | KOH | 1.2 |
| Nickel Zinc | Zn | NiOOH | KOH | 1.5-1.7 |
| Silver Zinc | Zn | AgO | KOH | 1.9 |
| Zinc Bromine | Zn | Bromine Complex | $ZnBr_2$ | 1.6 |
| Zinc manganese acetate | Zn | $Mn_2O_3/MnO_2$ | $CH_3COOH$ | 1.4-1.6 |
| Vanadium pentoxide ($V_2O_5$) | $V^{3+}$ and $V^{2+}$ | $VO^{2+}$ and $VO^{2+}$ | $H_2SO_4$ | 1.1 to 1.6 |
| Lithium Ion | Li | $Li_2CoO_2$ | PC or DMC $LiPF_6$ | 2.1-5 |

-continued

| Battery System | Negative Electrode | Positive Electrode | Electrolyte | Nominal Voltage (V) |
|---|---|---|---|---|
| Magnesium Ion | Mg | $NiO/Mo_6S_8$ | $(BMPMC)_2$—$AlCl_3$/THF | 1.0-1.4 |

In embodiments where the substrate 1 is a series of cards, the process involves laminating over the next substrate layer over the channel 10 thereby confining any chemicals in the channel 10. The layering is repeated of the sub-assembled cards and until sufficient power specification is met. The top of the channel 10 is blanked off by an insulating substrate 11. The conductive connector ends 4, 5 can then be coated with a conductive material 7, 8 to form a common connection point for the battery terminals.

In embodiments where the substrate 1 is in the form of a reel, the channel is covered by rolling a sub-assembled web onto itself thereby confining the chemicals with the underside of the substrate 1. Winding is continued until the end of the web. The conductive connector ends 4, 5 can then be coated with a conductive material 7, 8 to form a common connection point for the battery terminals.

The above process can be performed using conductive geometries formatted for single or multiple cells in series.

Figure 3:
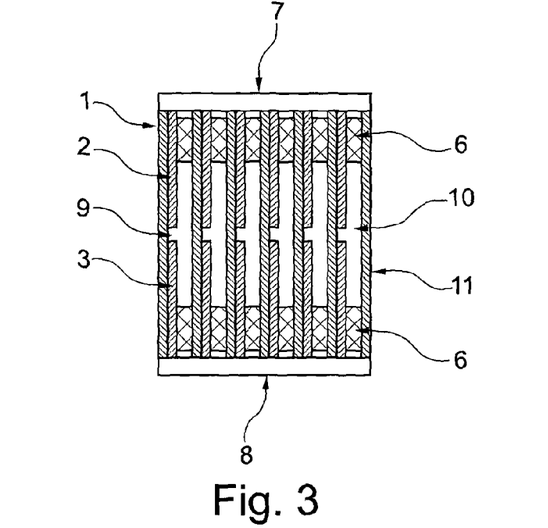
FIG. 3 is an end sectional view of multiple single cell energy storage batteries laminated together according to a further embodiment of the present invention.
Figure 4:
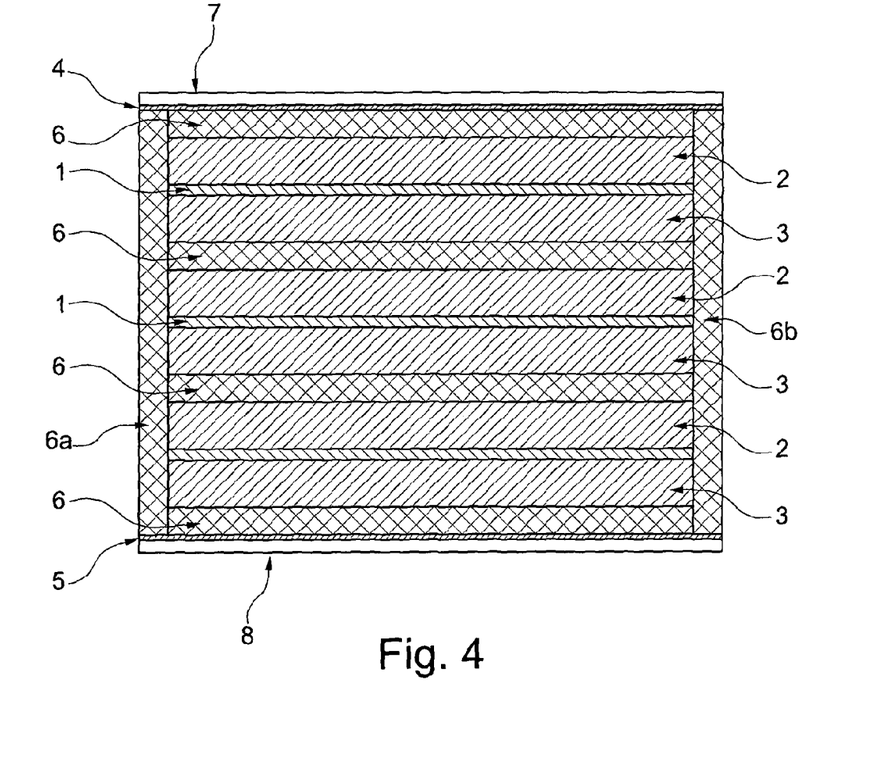
FIG. 4 is a top sectional view of a multiple single cell energy storage battery system showing three cells in series.

FIG. 3 is an end sectional view and FIG. 4 is a top sectional view of multiple single cell energy storage batteries laminated together according to the present invention. By joining multiple cells together in series as shown in FIG. 4, the battery voltage and power can be varied. Multiplying the number of cells multiplies the battery voltage as each cell voltage is added together. For example, for a nickel zinc chemistry with 1.6 V nominal cell voltage, a 3 series cell arrangement would give a battery with 4.8 V, and a 30 series cell arrangement would give 48 V.

Figure 4A:
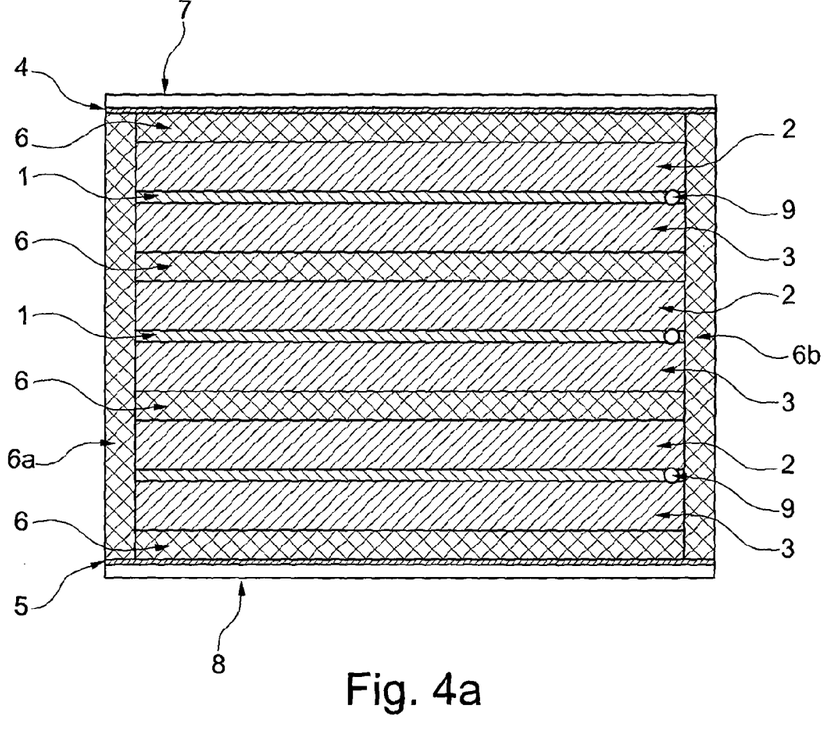
FIG. 4a is an alternative embodiment showing fill ports 9 located at the ends of the channels.

FIG. 4a is an alternative embodiment showing fill ports 9 located at the ends of the channels. The ports 9 would alternate between cell ends on each layer to allow electrolyte to be pump filled upwards in a zig-zag.

Figure 5:
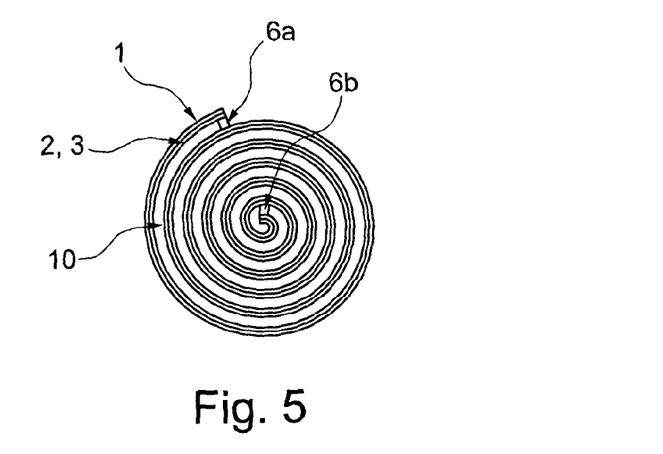
FIG. 5 is an end sectional view of a series of multiple single cell energy storage batteries laminated together wound into a roll according to a further embodiment of the present invention.

FIG. 5 is laminated cells of the present invention wound into a roll end sectional view.

Figure 6A:
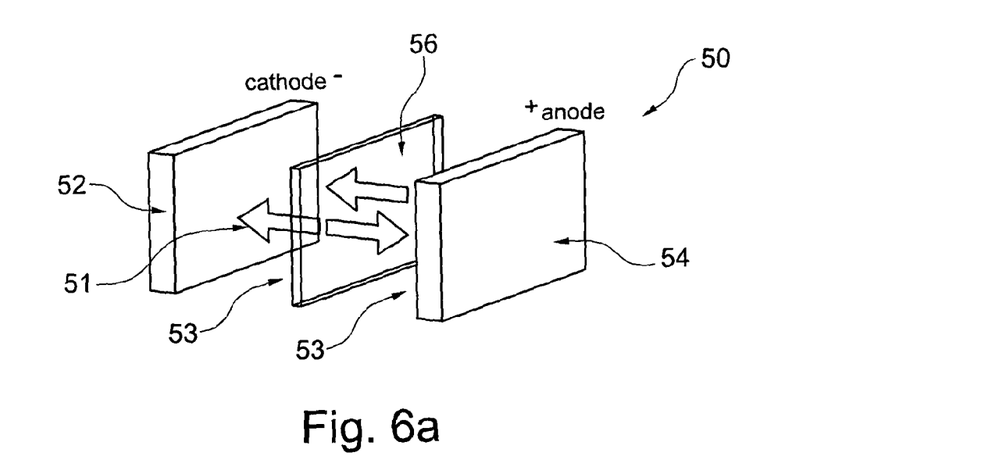
FIG. 6a is a schematic showing a conventional battery cell system arrangement.

FIG. 6a is a representation of a conventional battery cell generally designated 50. The conventional battery cell 50 comprises a cathode 52, an anode 54 and separator 56. Electrolyte ions need to rapidly pass through the separator 56. The chemistries are positioned at 53. The large arrows 51 denote ion flow in two directions.

Figure 6B:
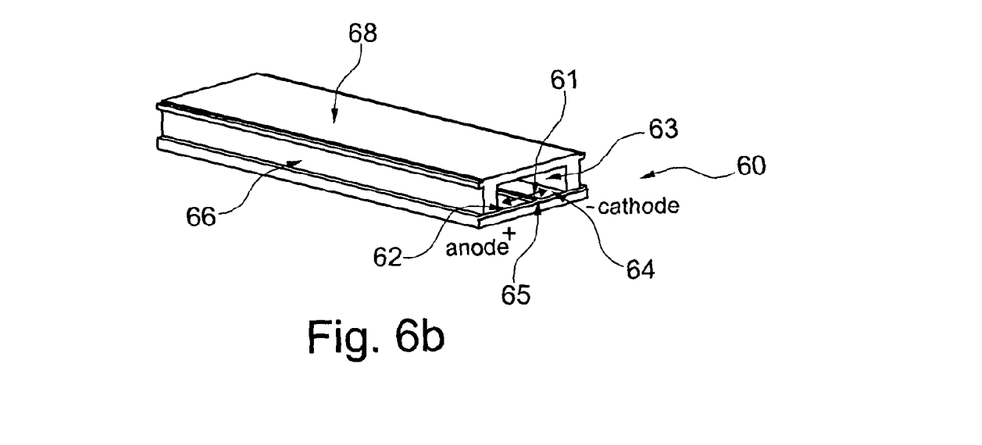
FIG. 6b is a schematic showing a single cell energy storage system according to a further embodiment of the present invention.

FIG. 6b is a representation of a single cell energy battery 60 of the present invention. There is shown a cathode 64 and an anode 62. Spacer elements 66 are shown to providing a supporting member for a laminate 68. The spacer elements 66 define the channel where the chemicals are held and define the distance between the outer sides of cathode 64 and anode 62. The spacer elements 66 also defines the top of the channels 10 and 63 and thus controls the volume of the chemicals held. The underside of the substrate onto which the conductive material is deposited can form the top of the channel 10 and 63 and bond directly to the spacer elements 66. The large arrows 61 denote ion flow in two directions.

FIG. 6b shows that the cathode 62 and anode 64 are in the same plane or at least substantially the same plane and are co-parallel and isolated by a small gap 65.

Figure 7:
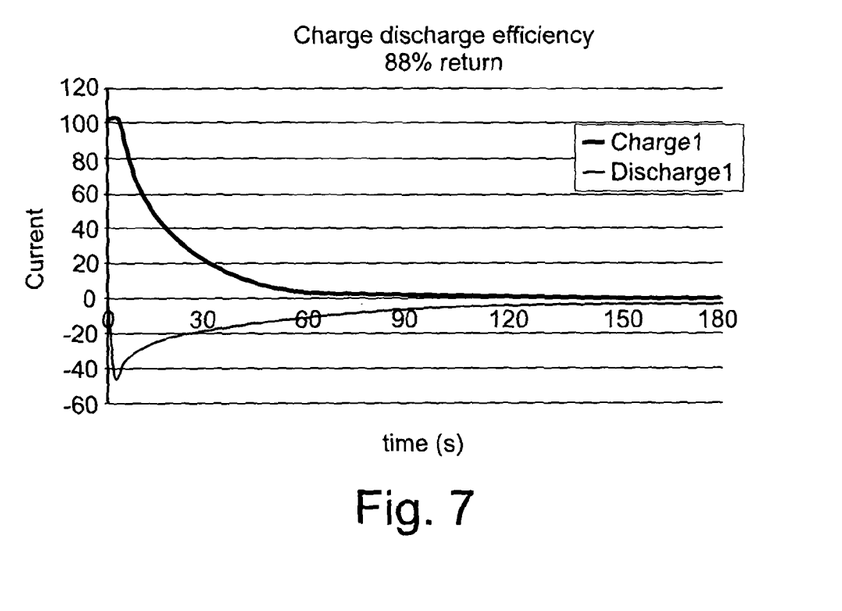
FIG. 7 is a graph of current v. time showing energy charge discharge efficiency for a single cell energy storage system according to a further embodiment of the present invention.
Figure 8:
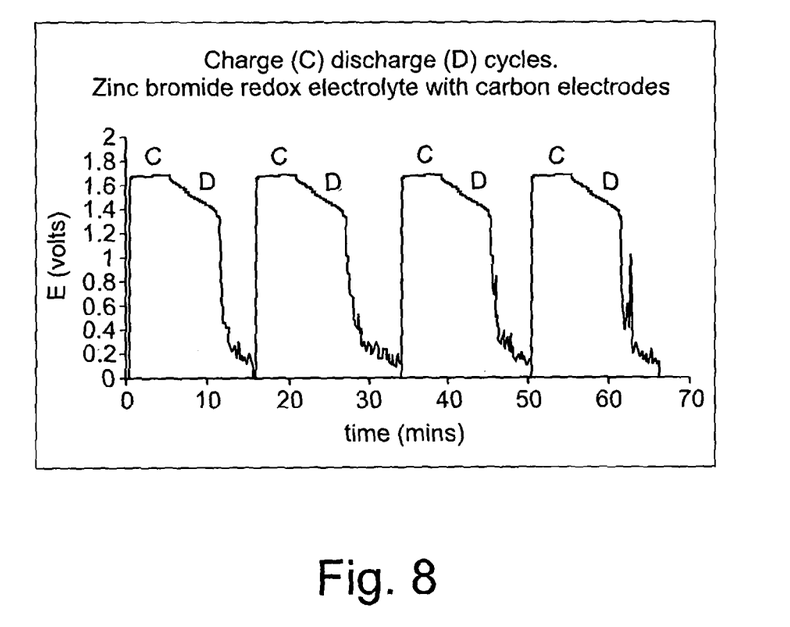
FIG. 8 is a graph showing voltage v. time for a single cell energy storage system according to a further embodiment of the present invention.

The electrodes can be of the same conductive material or of differing conductive materials, for example, gold as shown demonstrated by performance data in FIG. 7 or carbon as shown in FIG. 8. FIG. 7 shows the charge discharge curves for potassium ferricyanide redox couple chemistry in a gold cathode and anode electrode cell. FIG. 8 shows charge discharge cycles for zinc bromide chemistry in a carbon cathode and anode electrode cell.

For a given channel height and electrode dimension in the width 'W' direction the power of the battery can be varied by increasing or decreasing the length 'L'. This increases the amount of chemistry taking part in the electrochemical reaction within the cell. The voltage is the same and the current changes thus varying the power.

The thickness of the electrode layers can be determined to provide the best conductivity depending on the electrical and physical properties of the conductor, for example a 10 micron carbon layer or a 1 micron metal layer may be the preferred. To increase the conductivity of certain electrode films (e.g carbon), a highly conductive metal layer (e.g. aluminium or copper) could be applied to the substrate first and then coated with the electrode material. In addition a conductive composite layer, e.g. carbon with silver incorporated, could be employed for adjusting electrical resistance.

The cells of the present invention are intended to be packaged in a casing which incorporates connectors to the outer electrode terminals (+) and (−) as with standard battery encasing formats designed for ease of use and safety. The casing would be designed to take a stack of card cells and therefore be shaped square or rectangular, or as rolled up cells and cased similarly, or in cylinder format.

The cells of the present invention may be used in a variety of applications. For example, the cells may be used as energy storage in the renewable power industry, energy storage in supporting traditional power generation when in excess, electric vehicle power, uninterruptable power supplies and domestic power storage and supply supporting home wind/solar power generators and consumer electronics.

Whilst specific embodiments of the present invention have been described above, it will be appreciated that departures from the described embodiments may still fall within the scope of the present invention. For example, any suitable type of electrodes and chemicals can be used.

The invention claimed is:

1. A bipolar series cell arrangement comprising multiple energy storage batteries in series, each of said energy storage batteries comprising:
   an electrochemically inert and electrically insulating substrate;
   an anode located on one side of said substrate and a cathode located on the other side of said substrate, wherein the anode and cathode form electrodes which are located substantially co-planar and co-parallel to one another;
   a gap located between the anode and cathode which is capable of electrically insulating the anode and cathode;

a spacer defining a channel along the anode and cathode electrodes parallel to the gap between the electrodes; and an electrolyte deposited in the channel;

wherein one side of the anode or cathode electrode forms the cathode or anode of an adjacent cell as long as the two sides have the spacer layer along the middle of its length thereby isolating the adjacent cells electrolytes while maintaining electrical connection between the cells in series.

2. A bipolar series cell arrangement according to claim 1, wherein there are anode and cathode active materials contained within the electrolyte.

3. A bipolar series cell arrangement according to claim 1, wherein there is a top layer positioned along the channel and resting on the spacer; or wherein parts forming the energy storage battery are in the form of a spiral allowing the energy storage battery to be spiral shaped.

4. A bipolar series cell arrangement according to claim 1, wherein the electrochemically inert and electrically insulating substrate is a substantially flat planar structure and is made from a polymer film and has a thickness of about 0.1 mm.

5. A bipolar series cell arrangement according to claim 1, wherein the anode and cathode have a thickness of about 10 microns and are made from electrically conductive material; metal alloys; and carbon allotrope forms; and conducting polymer films or combinations of layers.

6. A bipolar series cell arrangement according to claim 5, wherein the carbon allotrope forms comprise carbon graphite or carbon graphene.

7. A bipolar series cell arrangement according to claim 1, wherein the anode and cathode are similar or dissimilar materials in the same cell design; or wherein the anode and cathode are capable of being reversed in operation.

8. A bipolar series cell arrangement according to claim 1, wherein the substrate and the anode and cathode electrodes have a spacer layer of about 0.2 mm in thickness located on their outer sides; or wherein the energy storage battery have conductive connector ends which are covered with conductive layers on the outer surface of the single cell energy storage battery wherein the conductive layers form common connection points for battery terminals.

9. A bipolar series cell arrangement according to claim 1, wherein the channel is filled and deposited with the required amount of electrolyte; or wherein an electrolyte is pumped into the channel in a battery comprising a stack of multiple cells with each cell having an entry hole alternating through the layers so as to fill the battery with minimal air entrapment.

10. A bipolar series cell arrangement according to claim 1, wherein an electrolyte is pumped into the channel in a battery comprising a spiral form with filling holes and the start and exit holes at the end of each cell within the spiral shape battery so as to fill the battery with minimal air entrapment; or wherein an electrolyte is pumped into the channel in a battery comprising a stack or spiral and where new electrolyte can be flushed through after charging to replenish the previous electrolyte fill so as to increase the battery power or to re-life the battery.

11. A bipolar series cell arrangement according to claim 1, wherein the electrolyte is deposited onto the substrate and electrodes and confined within the channel and wherein optionally the deposition occurs directly so that cathode and anode pastes are applied to the electrodes followed by electrolyte; or wherein chemicals forming the aqueous or organic based electrolyte are in the form of liquid or paste forms.

12. A bipolar series cell arrangement according to claim 1, wherein at least two or more or a plurality of multiple single cell energy storage batteries are laminated together; or wherein the energy storage battery contains at least an organic acid battery electrolyte between pH 3 and 6 comprising zinc, manganese, acetate and chloride ions in aqueous or organic solvent which self-forms separate cathode and anode chemistries on applying a charging voltage and current between the anode and cathode electrodes.

13. A bipolar series cell arrangement according to claim 12, wherein the separate cathode chemistry comprises manganese oxides and the separate anode chemistry comprises metallic zinc.

14. A method of manufacturing an energy storage battery for a bipolar series cell arrangement as defined in claim 1 comprising:

providing an electrochemically inert and electrically insulating substrate;

providing an anode located on one side of said substrate and a cathode located on the other side of said substrate, wherein the anode and cathode form electrodes which are located substantially co-planar and co-parallel to one another;

providing a gap located between the anode and cathode which is capable of electrically insulating the anode and cathode;

providing a spacer defining a channel along the anode and cathode electrodes parallel to the gap between the electrodes; and providing an electrolyte deposited in the channel.

15. A method of manufacturing an energy storage battery according to claim 14, wherein a substrate is first selected and then conductive layers are deposited; or wherein the substrate is a series of cards or a continuous web of material in a reel to reel process.

16. A method of manufacturing an energy storage battery according to claim 14, wherein the substrate is in the form of a reel, the channel is covered by rolling a sub-assembled web into itself thereby confining the chemicals with the underside of the substrate and winding is continued until the end of the web and conductive connector ends are coated with a conductive material to form a common connection for the battery terminals; or wherein the electrolyte is pumped into the battery cells via filling and exiting ports.

17. A method of manufacturing an energy storage battery according to claim 15, wherein the conductive layers are patterned to define conductive geometries making the electrodes and conductive connector ends.

* * * * *